United States Patent [19]

Caratsch

[11] 4,342,718
[45] Aug. 3, 1982

[54] METHOD AND APPARATUS FOR THE THERMAL TREATMENT OF IMPREGNATED MATERIAL WEBS

[75] Inventor: Hans-Peter Caratsch, Bremgarten, Switzerland

[73] Assignee: Sinter Limited, Bristol, England

[21] Appl. No.: 172,289

[22] Filed: Jul. 25, 1980

[30] Foreign Application Priority Data

Mar. 6, 1980 [CH] Switzerland .................. 1757/80

[51] Int. Cl.³ ........................................ B29D 7/22
[52] U.S. Cl. ............................... 264/345; 264/136; 264/137; 264/234; 264/236; 264/237; 264/257; 264/347; 264/348; 425/384; 425/404; 425/445; 425/509; 425/512
[58] Field of Search ............... 264/347, 136, 137, 257, 264/237, 234, 236, 568, 345, 348; 425/445, 404, 384, 509, 512

[56] References Cited

U.S. PATENT DOCUMENTS

| | | | |
|---|---|---|---|
| 2,997,096 | 8/1961 | Morrison et al. | 264/347 |
| 3,369,955 | 2/1968 | Rudloff | 425/445 |
| 4,051,214 | 9/1977 | Casper et al. | 264/137 |
| 4,172,869 | 10/1979 | Oishi et al. | 264/257 |
| 4,238,176 | 12/1980 | Cottrell, Jr. et al. | 264/257 |

OTHER PUBLICATIONS

Caratsch AG Brochure–"Impregnating Plants for Fabrics", pp. 1-18 . . . admitted prior art . . . 7/1980 . . .

Primary Examiner—Jeffery R. Thurlow
Attorney, Agent, or Firm—Werner W. Kleeman

[57] ABSTRACT

A material web impregnated with a settable synthetic resin travels in vertical direction, from the bottom towards the top, through a first heat treatment zone where the solvent of the synthetic resin or plastic is evaporated and there occurs a chemical reaction. The tacky material web departing from the first heat or thermal treatment zone then passes through a cooling zone where it is cooled by means of a cooling medium to such a degree that it does not stick to the deflection or diverting rolls over which the material web subsequently is guided. After deflection of the material web the latter is moved in vertical direction downwardly through a second heat treatment zone where the chemical reaction proceeds. Prior to winding-up of the material web the latter is further cooled. Before the first deflection roll and between the first pair of deflection rolls and the second pair of deflection rolls there is arranged a respective blowing or blast nozzle which blows a cooling medium against the face of the material web which comes into contact with the deflecting rolls. Consequently, there is caused further cooling of the material web and there is still further reduced the danger of the web sticking at the deflection rolls. By incorporating a cooling zone between the first heat treatment zone and the deflection rolls the material web can be moved at greater velocities through the installation, without the danger that it sticks to the deflection rolls.

23 Claims, 1 Drawing Figure

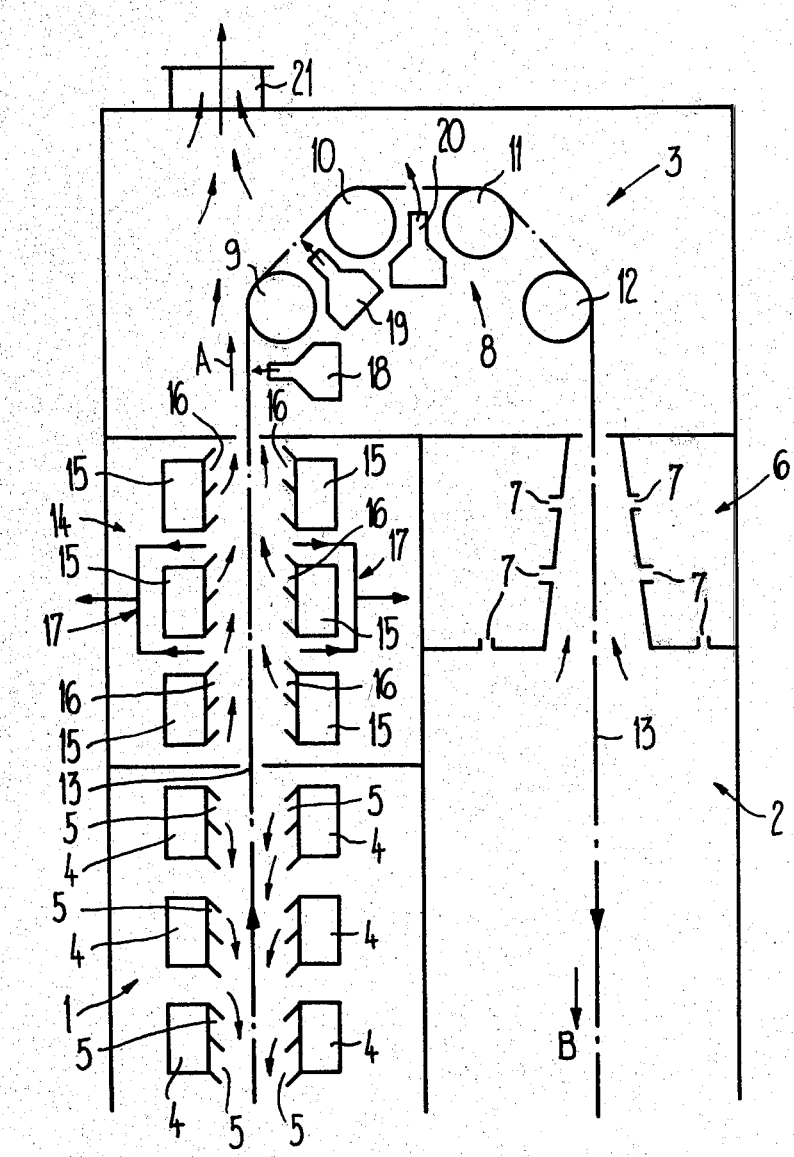

METHOD AND APPARATUS FOR THE THERMAL TREATMENT OF IMPREGNATED MATERIAL WEBS

BACKGROUND OF THE INVENTION

The present invention relates to a new and improved method of, and apparatus for, the thermal treatment of impregnated material webs, preferably those impregnated with a settable synthetic resin or plastic material.

Generally speaking, the method of the invention is of the type wherein the impregnated material web is guided in an upward direction through a first heat or thermal treatment zone, then through a deflection or diverting roll arrangement, and thereafter is guided in a downward direction through a second heat treatment zone.

This type drying method and apparatus for performing the same is particularly suitable for the thermal treatment of fleeces and fabrics formed of organic or inorganic fibres, especially glass fibre fabrics, wherein such web-like materials are impregnated with a thermosetting plastic material or resin.

With heretofore known installations of this type employing vertical guiding of the material web the latter is deflected during the thermal treatment processes, i.e. is deflected between the first and second heat or thermal treatment zones. In this way it is possible to maintain the structural height of the installation within acceptable limits. The material web which departs from the first heat treatment zone is however still tacky since the thermal treatment has not been completed. This is accompanied by the danger that the material web might stick upon the deflection rolls. If it were intended to treat the material web in the first heat treatment zone to such an extent that the web, upon leaving such first heat treatment zone, no longer would tend to stick to the deflection rolls, then it would be necessary to correspondingly increase in length such first heat treatment zone, and therefore, there would have to be tolerated an increase in the structural height of the plant or installation or it would have been necessary to move the material web at a correspondingly reduced velocity through the plant. In order to be able to prevent too intensified setting of the impregnation agent in this case, the second heat treatment zone cannot be fully made use of as concerns its temperature.

To prevent sticking of the material web at the deflection or diverting rolls it also has already been proposed to provide an additional cooling device directly before the first deflection roll. This additional cooling device is arranged at the side or face of the material web which comes to bear upon the deflection rolls and blows a suitable cooling medium, for instance air, against this one side of the material web. When the system works at high velocities of movement of the material web it is not possible to effectively preclude, through the use of these measures, that the material web will not become stuck at the deflection rolls.

SUMMARY OF THE INVENTION

Therefore, with the foregoing in mind it is a primary object of the present invention to provide a new and improved method of, and apparatus for, the thermal treatment of impregnated material webs, which is not afflicted with the aforementioned drawbacks and limitations of the prior art proposals discussed herein.

Another and more specific object of the present invention aims at providing a new and improved method of, and apparatus for, the thermal treatment of material webs wherein even when working with large speeds of movement of the material web there can be effectively prevented adhesive binding or sticking of the material web at the deflection rolls.

Now in order to implement these and still further objects of the invention, which will become more readily apparent as the description proceeds, the method aspects for the thermal treatment of impregnated material webs, as contemplated by the invention, is manifested by the features that the material web, after departing from the first heat treatment zone and before passing the deflection roll arrangement, is guided through a cooling zone.

As alluded to above, the invention is not only concerned with the aforementioned method aspects, but also deals with apparatus for the performance thereof. According to a preferred constructional design of the inventive apparatus a cooling zone is arranged following the first heat or thermal treatment zone and before the deflection roll arrangement.

In the cooling zone the material web is cooled to such a degree that it can be guided over the deflection rolls without any tendency to stick thereto. Since it is not necessary to accommodate the course of the thermal treatment in the first thermal or heat treatment zone to the requirement that the material web not stick to the deflection rolls, it is therefore beneficially possible to subdivide the thermal treatment process at both of the thermal or heat treatment zones in a manner such that also full use can be made of the second thermal or heat treatment zone.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates the upper portion of a vertical installation or plant for the heat or thermal treatment of impregnated material webs.

DETAILED DESCRIPTION OF THE PREFERRED EMBODIMENTS

Describing now the drawing, the plant or installation illustrated by way of example in FIG. 1 will be seen to comprise a first heat or thermal treatment zone 1, where there has only been illustrated the upper portion and which extends from the bottom towards the top of the illustrated arrangement. Neighboring such first heat treatment zone 1 is a second heat treatment zone 2 which extends from the top towards the bottom and of which likewise there has only been illustrated the upper portion. Above both of the heat treatment zones 1 and 2 there is arranged a deflection region or zone 3. The construction of both heat treatment zones 1 and 2 extensively corresponds to the construction of both heat treatment zones of known installations and therefore can be assumed to be well known in this technology. At the upper region of the first heat treatment zone 1 there are arranged in superimposed relationship and so as to be situated oppositely of one another the blow chests or casings 4 which are provided with air infeed nozzles 5, through which effluxes a downwardly directed flow of a heated medium, typically for instance a current of heated air, as the same has been illustrated by the arrows. At the lower end of the first heat treatment zone 1, and which lower end of such zone has not been particularly shown in the drawing, there is provided a suction device for sucking-off the heating medium.

The second heat treatment zone 2 possesses at its lower region, which also has not been shown in the drawing, also blowing chests or casings containing air infeed nozzles, like the structure 4, 5 previously discussed, and through which a current of a hot medium, for instance a current of warm air departs which is then upwardly directed. As clearly illustrated, at the upper end of the second heat treatment zone 2 there is provided an only schematically illustrated suction device 6 which is equipped with inlet openings 7 through which passes the hot air and is conducted away.

In the deflection zone or region 3 there is arranged in conventional manner a deflection roll arrangement which is constituted by four deflection rolls 9, 10, 11 and 12.

The material web 13, which is impregnated in the usual manner with any suitable impregnation agent, passes through the plant in upward direction, i.e. in the direction of the arrow A, and moves initially through the first heat or thermal treatment zone 1 where it is guided between the oppositely located blowing chests or casings 4. The material web 13 which passes over the deflection rolls 9, 10, 11 and 12 is deflected and then subsequently moves in a downward direction, i.e. in the direction of the arrow B and travels through the second heat treatment zone 2. Between the second heat treatment zone 2 and the station where the processed material web is wound-up this material web 13 is cooled in conventional manner.

To the extent previously described this plant or installation corresponds to conventional plants of this type.

Now in order to avoid, even when working with large throughput velocities of the material web 13 that such web 13 will stick to the deflection rolls 9, 10, 11, 12, a cooling zone 14 is arranged between the first heat treatment zone 1 and the deflection region or zone 3. In this cooling zone 14 there are provided blowing chests or casings 15 which are arranged above one another with respect to the direction of movement A of the material web 13 and opposite one another with respect to such material web 13. As schematically illustrated, the blowing or blast casings 15 are equipped with outlet nozzles 16, through which effluxes a current of a cooling medium which is directed against the material web 13, for instance an air flow, and the same has been illustrated by the arrows. Moreover, a suction device 17 is arranged in the cooling zone 14, this suction device being merely schematically illustrated and withdrawing the cooling medium out of the cooling zone 14.

In the deflection or diverting region or zone 3 there are arranged three blowing nozzles 18, 19 and 20 which apply to the material web 13, at the face or side thereof coming into contact with the deflecting rolls 9, 10, 11, 12, a cooling medium, typically air. The blowing nozzle 18 is arranged, viewed with respect to the direction of movement or travel A of the material web 13, forwardly of the first deflection roll 9, whereas both of the remaining blowing or air infeed nozzles 19 and 20 are arranged between the first deflection roll pair 9, 10 and the second deflection roll pair 10, 11. By means of a flue 21 or equivalent removal device it is possible to withdraw the cooling medium out of the deflection region or zone 3.

Having now had the benefit of the foregoing description of a preferred exemplary embodiment of the invention there will now be described the mode of operation of the heretofore discussed installation or plant and the same is as follows: after passing through a conventional impregnation device the impregnated material web 13 is moved upwardly in vertical direction through the first heat treatment zone 1. The material web 13 is then impinged at both faces by the hot fluid medium which flows in countercurrent. In this first heat treatment zone 1 there thus initially occurs a slow heating-up of the material web 13, as well as an evaporation of the solvent and a chemical reaction (pre-polymerization, pre-polyaddition, pre-polycondensation). The material web 13 which departs from the first heat treatment zone 1, and which is still in a tacky state, then moves between the blowing casings or chests 15 of the cooling zone 14. Due to the action of the medium which impinges the material web 13 at both of its faces this material web 13 is therefore cooled to such an extent that it can pass the deflection rolls 9, 10, 11, 12 without sticking thereto. Now in order to avoid that cooling air from the cooling zone 14 can reach the lower situated first heat or thermal treatment zone 1, the suction device 17 withdraws a greater quantity of cooling medium, due to the applied suction action, then the quantity of cooling medium which is infed into the cooling zone 14 by means of the blowing chests or casings 15. The pressure in the cooling zone 14 is therefore less than the pressure prevailing in the first heat treatment zone 1.

The three blowing nozzles 18, 19 and 20 within the deflection or diverting region 3, as already explained, therefore impinge the material web 13 at both of its faces with cooling air, so that there is brought about a further cooling of the face of the material web 13 which passes over the deflection rolls 9, 10, 11 and 12, with the result that there is additionally reduced any danger of sticking of the material web 13 to such deflection rolls 9, 10, 11, 12. In this regard it must however be mentioned that for the effective prevention of any adhesive bonding or sticking of the material web 13 the use of such blowing nozzles, 18, 19 and 20 is not absolutely necessary and that in certain cases the cooling action which prevails in the cooling zone 14 is adequate for itself in order to prevent the material web from sticking to the rolls.

After deflection of the material web 13 in the deflection region or zone 3 the material web 13 is guided, in the direction of the arrow B, through the second heat treatment zone 2 where there progresses the previously initiated chemical reaction which has started in the first heat treatment zone 1 (post-polymerization, post-polyaddition, post-polycondensation). Prior to winding-up the material web 13 the latter, as already mentioned, is cooled, in order to rapidly bring the frequently still slightly tacky impregnation agent to room temperature and to stop the chemical process, and thus to ensure the endurance or durability of the impregnated material web 13.

The described installation is particularly suitable for the thermal treatment of fabrics and fleeces formed of organic and inorganic fibres. In particular, it is possible to prepare by means of this installation impregnated glass fibre fabrics.

As the impregnation agent there can be beneficially used, in particular, settable plastics (thermosetting plastics), for instance melamine, phenolic, polyester, epoxy and silicone resins.

The impregnated material webs which have been heat treated in the described installation are preferably further processed into laminates, as the same are used, by way of example and not limitation, in the electrical and electronic industries, for instance for printed circuits.

While there are shown and described present preferred embodiments of the invention, it is to be distinctly understood that the invention is not limited thereto, but may be otherwise variously embodied and practiced within the scope of the following claims. Accordingly,

What I claim is:

1. In a method of heat treating impregnated material webs, especially material webs impregnated with a settable synthetic resin, where in the impregnated material web is guided in an upward direction through a first heat treatment zone, thereafter about a deflection roll arrangement, and then is guided in a downward direction through a second heat treatment zone, the improvement which comprises the steps of:
   guiding the material web, after departing from the first heat treatment zone of a first length and, before passage through the deflection roll arrangement, through a cooling zone wherein the material web is cooled at both sides, and, after passage through the deflection roll arrangement through the second heat treatment zone of a second longer length.

2. The method as defined in claim 1, further including the steps of:
   applying to both faces of the material web in said cooling zone a gaseous cooling medium.

3. The method as defined in claim 2, further including the steps of:
   using as the cooling medium air.

4. The method as defined in claim 1, further including the steps of:
   applying to the material web, prior to its entry into the deflection roll arrangement, at a face of said material web which confronts an immediately following deflection roll of said deflection roll arrangement a cooling medium.

5. The method as defined in claim 4, wherein:
   said cooling medium is air.

6. The method as defined in claim 4, further including the steps of:
   utilizing as the deflection roll arrangement a plurality of deflection rolls over which there is guided said material web; and
   impinging the material web at least between a first pair of said deflection rolls, viewed with respect to the direction of movement of said material web, at its face coming into contact with said deflection rolls, with a cooling medium.

7. The method as defined in claim 6, wherein:
   said cooling medium is air.

8. The method as defined in claim 1, further including the steps of:
   selecting as the material web a web constituted by at least any one of fleeces or fabrics formed of organic or inorganic fibres and impregnated with a thermosetting resin.

9. The method as defined in claim 8, wherein:
   said material web is a glass fibre fabric.

10. An apparatus for heat treating impregnated material webs, especially material webs impregnated with a settable synthetic resin, comprising:
    means defining a first heat treatment zone for the material web;
    said first heat treatment zone extending essentially from a lower region towards an upper region thereof;
    a deflection roll arrangement for deflecting the material web arranged following said first heat treatment zone;
    a second heat treatment zone arranged following said deflection roll arrangement and extending from a top region towards a bottom thereof;
    means defining a cooling zone arranged after said first heat treatment zone and before said deflection roll arrangement; and
    wherein said second heat treatment zone is higher than said first heat treatment zone by a dimension which is substantially equal to the height of said cooling zone.

11. The apparatus as defined in claim 10, further including the steps of:
    means for applying a gaseous cooling medium to both faces of said material web in said cooling zone.

12. The apparatus as defined in claim 11, wherein:
    said cooling medium-applying means serves to apply air as the cooling medium.

13. The apparatus as defined in claim 11, wherein:
    said cooling medium-applying means comprises outlet nozzles for the cooling medium arranged within the cooling zone to both sides of the direction of movement of the material web and behind one another with respect to said direction of movement of said material web.

14. The apparatus as defined in claim 11, further including:
    a suction device for the cooling medium arranged in said cooling zone.

15. The apparatus as defined in claim 14, wherein:
    said suction device serves to maintain the pressure in the cooling zone lower than the pressure prevailing in the first heat treatment zone.

16. The apparatus as defined in claim 10, further including:
    blowing means provided following the cooling zone and before said deflection roll arrangement; and
    said blowing means being arranged at a side of the material web which confronts a successive deflection roll of said deflection roll arrangement and serves to apply a cooling medium to one face of said material web.

17. The apparatus as defined in claim 16, wherein:
    said blowing means serves to apply air as the cooling medium.

18. The apparatus as defined in claim 16, wherein:
    said deflection roll arrangement comprises a plurality of deflection rolls;
    a further blowing means provided at least between a first pair of said deflection rolls, viewed with respect to the direction of movement of the material web;
    said further blowing means being arranged at a side of the material web which comes into contact with the deflection rolls; and
    said further blowing means applying a cooling medium to one face of said material web.

19. The apparatus as defined in claim 18, wherein:

said further blowing means applies air as the cooling medium.

20. The apparatus as defined in claim 10, wherein: said apparatus is used for the heat treatment of material webs constituted by at least any one of fleeces of fabrics formed of organic or inorganic fibres and impregnated with a thermosetting resin.

21. The apparatus as defined in claim 20, wherein: said material web comprises glass fibre fabrics.

22. The method as defined in claim 1, wherein: said cooling zone acts upon the impregnated material web to such a degree that there is substantially inhibited any further chemical reaction of the settable synthetic resin and the existing tackiness of the impregnated material web is essentially frozen at its then existing state.

23. The method as defined in claim 1, wherein: the material web is passed through the first and second heat treatment zones of different lengths which afford respectively different dwell times for the throughpassing material web.

* * * * *